Nov. 24, 1953
J. H. HEGLER, JR
2,659,996
BAIT CLAMP
Filed May 31, 1951
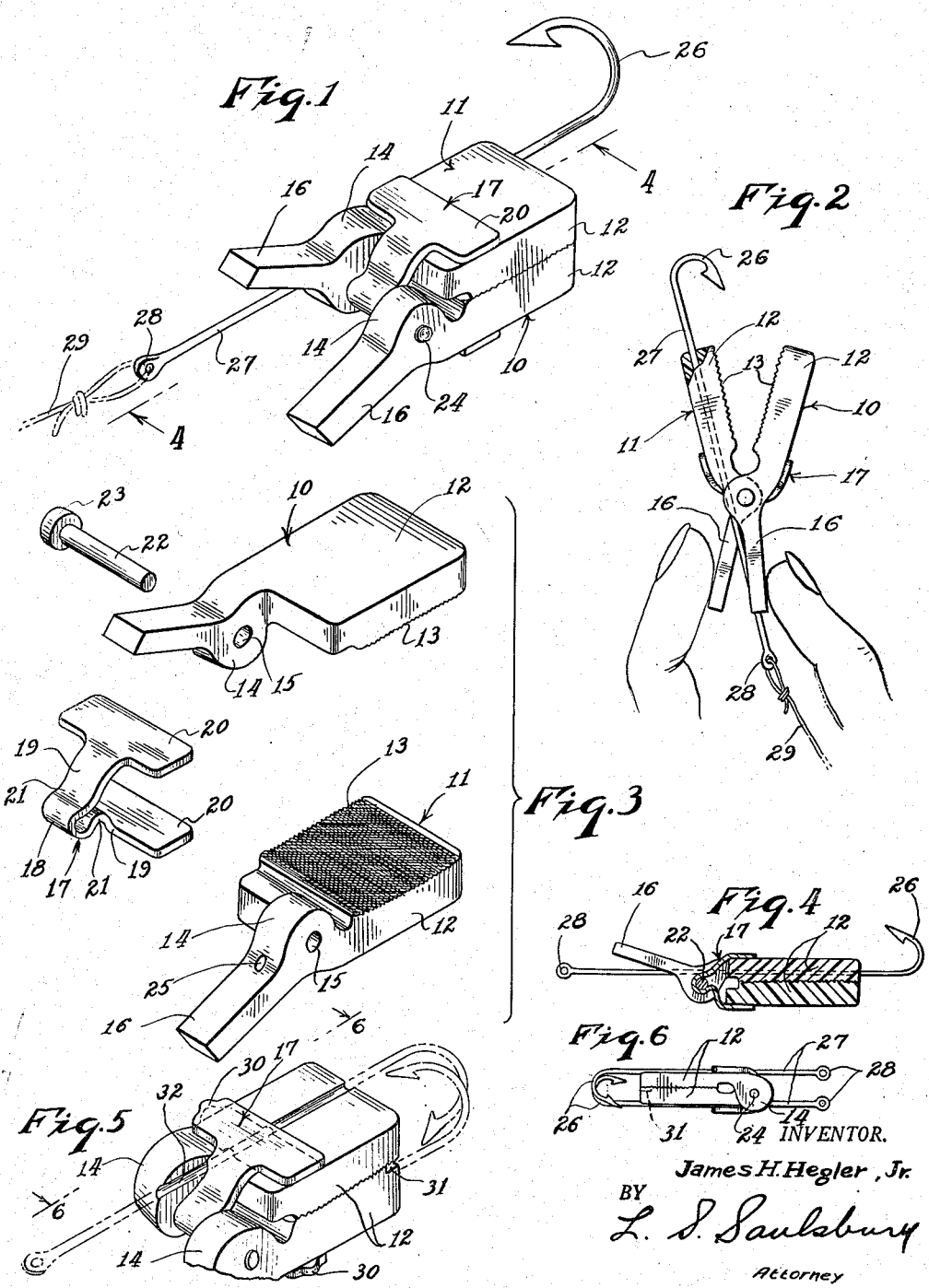
INVENTOR.
James H. Hegler, Jr.
BY
L. S. Saulsbury
Attorney Patented Nov. 24, 1953

2,659,996

UNITED STATES PATENT OFFICE 2,659,996

BAIT CLAMP

James H. Hegler, Jr., Cleveland, Ohio

Application May 31, 1951, Serial No. 229,095

2 Claims. (Cl. 43—44.6)

The present invention relates to a bait clamp and it consists in the combinations, constructions and arrangements of parts herein described and claimed.

Generally there is provided a device having a novel means for securely holding bait adjacent a fish hook and there is provided a clamp having a pair of pivoted jaws which are held together by a U-type spring. A fish hook is integrally molded with one of the jaw members. In an alternate design there is provided one of such hooks in each of the jaw members, the hooks extending in opposite directions and toward each other. The jaw members are serrated to increase the holding power and there is provided opening tabs which are located at the extreme sides of the jaws. The eccentric location of the pivot bearing allows the spring to be centrally fixed with relation to the jaws.

It is accordingly an object of the invention to provide a device of the character set forth which is simple in construction, inexpensive to manufacture and yet effective and efficient in use.

Another object of the invention is to provide a device of the character set forth having novel bait holding means.

Still another object of the invention is the provision, in a device of the character set forth, of a novel spring construction forming a part of the invention.

A still further object of the invention is the provision, in a device of the character set forth, of a novel arrangement of fish hooks forming a part of the invention.

Other and further objects of the invention will become apparent from a reading of the following specification taken in conjunction with the drawing, in which:

Figure 1 is an isometric view of an embodiment of the invention,

Figure 2 is a reduced side elevational view, partly broken away, of the device shown in Figure 1, Figure 3 is an exploded isometric view illustrating certain details of construction, Figure 4 is a reduced sectional view taken along line 4—4 of Figure 1, Figure 5 is a fragmentary isometric view illustrating a modified form the invention may assume, and Figure 6 is a further reduced side elevational view of the device illustrated in Figure 5.

Referring more particularly to the drawing, there is shown therein a pair of jaws generally indicated at 10 and 11 each provided with a substantially square body 12 provided with an inner serrated face 13 and each having integrally formed therewith adjacent one end thereof a collar 14 having an opening 15 extending therethrough and, integrally with the collar 14, an outwardly and rearwardly extending handle 16.

A U-type spring is generally indicated at 17 and consists of a rounded bight portion 18 and a pair of legs 19 each of which is provided at its free end with an enlarged portion 20. The legs 19 are inwardly crimped, as indicated at 21, immediately adjacent the bight portion 18.

A pin 22 having a head 23 interconnects the jaws 10 and 11 by extending through the openings 15 in the collar 14 and the free end of the pin 22 may be peened, as indicated at 24, after the device is assembled. An opening 25 extends through the collar 14 and handle 16 to the outer end of the portion 12 in the jaw 11 and avoids the opening 15 in such passage. A fish hook 26 is provided with an elongated shank 27 which extends through the opening 25 and provided with an eye 28 at its rearward end. The shank 27 is securely fastened within the opening 25 so as to be substantially integral with the jaw construction 11.

It will be seen that the spring 17 is positioned upon the assembled device between the collars 14 in such manner that one of the enlarged portions 20 bears against the outer face of each of the jaw members 12 and that the bight portion 18 and the crimped portions 21 almost completely encircle the pin 22 between the collars 14.

In the operation of this form of the invention, it will be apparent that by pressing the handle 16 in opposite directions that the jaws 10 and 11 will move away from each other and that thereafter bait may be placed between the jaws so that upon release of the handles 16 the same will be securely held therebetween, the serrated faces 13 aiding the holding of such bait in the device. Thereafter the eye 28 may be attached to the conventional fishing line 29 so that the device may be moved through the water in conventional manner.

In the form of the invention illustrated in Figures 5 and 6 there is shown an identical construction with that hereinabove described with the exception that the handles 16 have been eliminated so that the device may be moved through weeds and the like without catching. In addition, each of the enlarged portions 20 is provided with a lateral extension 30 which projects outwardly at either side of the assembled device to aid in opening the jaws when it is desired to insert new bait or to remove the old bait. The device is provided further with a cut away portion 31 at one of the outer corners of the jaw members 12 to provide a means for inserting the thumbnail of the user to assist in opening the jaws. Also, each of the jaws is provided, in the present case, with a longitudinal opening 32 which extends through the collar portion 14 and the body 12 of each of the jaw members so that a pair of hooks 26 may be accommodated in this form of the invention. The points of the hooks 26 in the form of the invention shown in Figures 5 and 6 may extend toward each other and in safety positions, as when the device is not in use. When the device is put in use the hooks are preferably turned to extend in opposite directions from one another and out from the body portions.

While but two forms of the invention have been shown and described herein, it will be readily apparent to those skilled in the art that many minor modifications may be made without departing from the spirit of the invention or the scope of the appended claims.

What is claimed is:

1. A device of the character described comprising a pair of opposed jaws each having a relatively large square body portion and an apertured collar integrally formed at the rear thereof and adjacent one side thereof, said collars and apertures being in transverse alignment, a pin extending through the apertures in said collars, each body portion including a longitudinally-extending groove in its outer surface, the adjacent inner surfaces being serrated, a U-type spring encompassing the rear portions of said jaws to urge the same toward each other, and a pair of fish hooks each having its shank seated in one of said grooves, said hooks being adjustable in their grooves so that their points extend either outwardly from the body portions or inwardly and toward each other to safety positions, said spring having a rounded bight portion and a pair of legs, said legs each being inwardly crimped adjacent the bight portion whereby to partially encompass the pin between said collars and a transversely extending enlarged free end portion of the spring, said end portion holding the adjacent hook in its associated groove, and one of said jaws having a cut-away portion in its inner face at the outer edge of one of the forward corners thereof to form a finger engaging recess.

2. A device of the character described comprising a pair of opposed jaws each having a relatively large square body portion and an apertured collar integrally formed at the rear thereof and adjacent one side thereof, said collars and apertures being in transverse alignment, a pin extending through the apertures in said collars, each body portion including a longitudinally-extending groove in its outer surface, the adjacent inner surfaces being serrated, a U-type spring encompassing the rear portions of said jaws to urge the same toward each other, and a pair of fish hooks each having its shank seated in one of said grooves, said hooks being adjustable in their grooves so that their points may extend either outwardly from the body portions or inwardly and toward each other to safety position, said shanks of the respective hooks being engaged respectively by said spring, said spring having a rounded bight portion and a pair of legs, said legs each being inwardly crimped adjacent the bight portion whereby to partially encompass the pin between said collars and a transversely extending enlarged free end portion of the spring, said end portion holding the adjacent hook in its associated groove and means on at least one of the jaws to facilitate opening thereof.

JAMES H. HEGLER, Jr.

References Cited in the file of this patent

UNITED STATES PATENTS

| Number | Name | Date |
|---|---|---|
| 1,324,109 | Dutes | Dec. 9, 1919 |
| 2,471,606 | Burns | May 31, 1949 |